(12) United States Patent
Yang et al.

(10) Patent No.: US 6,304,027 B1
(45) Date of Patent: Oct. 16, 2001

(54) MIXED GREEN-EMITTING PHOSPHOR AND CATHODE RAY TUBE USING THE SAME

(75) Inventors: Jun-mo Yang, Suwon; Won-ho Yun, Kyungki-do, both of (KR)

(73) Assignee: Samsung Display Devices Co., Ltd., Kyungki-do (KR)

( * ) Notice: Subject to any disclaimer, the term of this patent is extended or adjusted under 35 U.S.C. 154(b) by 0 days.

(21) Appl. No.: 08/082,576

(22) Filed: Jun. 28, 1993

(30) Foreign Application Priority Data

Feb. 11, 1993 (KR) .................................................. 93-1845

(51) Int. Cl.$^7$ ............................. H01J 29/20; C09K 11/54; C09K 11/59; C09K 11/62
(52) U.S. Cl. ................................. 313/468; 252/301.4 R; 252/301.4 H; 252/301.4 F
(58) Field of Search ................................... 313/467, 468, 313/486, 487; 252/301.4 R, 301.4 H, 301.4 F

(56) References Cited

U.S. PATENT DOCUMENTS

| | | | |
|---|---|---|---|
| 4,924,139 | * | 5/1990 | Morita et al. ........................ 313/468 |
| 5,196,763 | * | 3/1993 | Yang et al. ........................... 313/468 |
| 5,363,013 | * | 11/1994 | Matsukiyo et al. .................. 313/468 |

FOREIGN PATENT DOCUMENTS

| | | | | |
|---|---|---|---|---|
| 5790851 | * | 6/1982 | (JP) | ............................... H01J/29/20 |
| 01215884 | * | 8/1989 | (JP) | ............................... C09K/11/08 |
| 0211694 | * | 1/1990 | (JP) | ............................... C09K/11/08 |
| 91-16901 | | 11/1991 | (KR) | ............................... C09K/11/77 |

* cited by examiner

*Primary Examiner*—Michael H. Day
(74) *Attorney, Agent, or Firm*—Leydig, Voit & Mayer, Ltd.

(57) ABSTRACT

A mixed green-emitting phosphor manufactured by mixing about 20 to 60 weight percent of $Y_3(Al,Ga)_5O_{12}$:Tb phosphor, less than about 30 weight percent of LaOCl:Tb phosphor, less than about 60 weight percent of $Y_2SiO_5$:Tb phosphor, and less than about 20 weight percent of $Zn_2SiO_4$:Mn phosphor and a cathode ray tube employing it are disclosed. The luminance characteristic is excellent under a high current density.

14 Claims, No Drawings

US 6,304,027 B1

MIXED GREEN-EMITTING PHOSPHOR AND CATHODE RAY TUBE USING THE SAME

BACKGROUND OF THE INVENTION

The present invention relates to a mixed green-emitting phosphor and a cathode-ray tube using the same, and in more detail, to a mixed green-emitting phosphor for use in a projection cathode-ray tube which has an excellent luminance saturation characteristic under high current density and a cathode-ray tube using the same.

In a green-emitting phosphor for use in a general cathode-ray tube, ZnS-based phosphors, such as ZnS:Cu,Au,Al phosphor, ZnS:Cu,Al phosphor, etc., are generally used.

However, cathode-ray tubes which are operated under high current density and high voltage drive have recently attracted much attention as cathode-ray tubes become large and high-definition. Therefore, a phosphor of high luminance especially under high current density, is needed. However, since the conventional ZnS-based phosphors are unable to provide sufficient luminance effects under high current density, the rare earth phosphors have been used recently.

As examples of rare earth green-emitting phosphors which are activated under high current density, such as in the projection cathode-ray tube, $Y_3(Al,Ga)_5O_{12}$:Tb phosphor, $InBO_3$:Tb phosphor, $Y_2SIO_5$:Tb phosphor, LaOCl:Tb phosphor, $Zn_2SiO_4$:Mn phosphor, or mixtures thereof can be enumerated.

The $Y_3(Al,Ga)_5O_{12}$:Tb phosphor has good current-luminance saturation characteristics and high emitting luminance.

The $Y_2SiO_5$:Tb phosphor is known as having high color purity, short afterglow time and, especially, good luminance saturation characteristics.

For the LaOCl:Tb phosphor, it has good current-luminance saturation characteristics and high color purity.

$Zn_2SiO_4$:Mn phosphor is known as not having good luminance saturation and afterglow characteristics, but having excellent color purity.

The $InBO_3$:Tb phosphor has a high resistance under high current density, is suitable for use in the projection cathode-ray tube, and has good color purity. Meanwhile, the afterglow time is long so as to mix with the phosphor whose afterglow time is short when applied to a cathode-ray tube.

There are many mixed green-emitting phosphors prepared by mixing the above-mentioned rare earth-based phosphors. As one example, U.S. Pat. No. 4,924,139 discloses a mixed phosphor of $InBO_3$:Tb with $Y_3(Al,Ga)_5O_{12}$:Tb whose color purity is excellent and whose afterglow time is short.

However, the above mentioned phosphors and the mixed phosphors thereof have undesirable luminance saturation and deterioration characteristics. Accordingly, there are many problems that should be improved in the known phosphors.

SUMMARY OF THE INVENTION

It is an object of the present invention, for improving the problems occurring when the phosphors are activated under high current density, to provide a mixed green-emitting phosphor which has excellent luminance saturation characteristics and deterioration characteristics, by mixing phosphors having excellent characteristics but without using $InBO_3$:Tb phosphor.

It is another object of the present invention to provide a cathode ray tube whose luminance and luminance saturation characteristics are very good, and which is manufactured using the mixed green-emitting phosphor of the present invention.

To accomplish the above-mentioned first object, there is provided in the present invention, a mixed green-emitting phosphor manufactured by mixing and containing $Y_3(Al,Ga)_5O_{12}$:Tb, LaOCl:Tb, $Y_2SiO_5$:Tb and $Zn_2SiO_4$:Mn phosphors in the following concentrations: about 20 to 60 weight percent of $Y_3(Al,Ga)_5O_{12}$:Tb phosphor, no more than about 30 weight percent of LaOCl:Tb phosphor, no more than about 50 weight percent of $Y_2SiO_5$:Tb phosphor, and no more than about 20 weight percent of $Zn_2SiO_4$:Mn phosphor.

Desirably, the mixed green-emitting phosphor is manufactured by mixing and contains $Y_3(Al,Ga)_5O_{12}$:Tb, LaOCl:Tb, $Y_2SiO_5$:Tb and $Zn_2SiO_4$:Mn phosphors in amounts of: about 20 to 50 weight percent of $Y_3(Al,Ga)_5O_{12}$:Tb phosphor, no more than about 20 weight percent of LaOCl:Tb phosphor, no more than about 40 weight percent of $Y_2SiO_5$:Tb phosphor, and no more than about 10 weight percent of $Zn_2SiO_4$:Mn phosphor.

The first object of the present invention can be also accomplished by a mixed green-emitting phosphor manufactured by mixing and containing $Y_3(Al,Ga)_5O_{12}$:Tb, $Y_2SiO_5$:Tb and $Zn_2SiO_4$:Mn phosphors in the following concentrations: about 20 to 60 weight percent of $Y_3(Al,Ga)_5O_{12}$:Tb phosphor, no more than about 60 weight percent of $Y_2SiO_5$:Tb phosphor, and no more than about 20 weight percent of $Zn_2SiO_4$:Mn phosphor without using LaOCl:Tb phosphor.

When three phosphors as mentioned above are mixed so as to manufacture the mixed phosphor of the present invention, an excellent effect also could be obtained, though using up to about 60 weight percent of $Y_2SiO_5$:Tb phosphor.

Desirably, the mixed green-emitting phosphor is manufactured by mixing and contains $Y_3(Al,Ga)_5O_{12}$:Tb, $Y_2SiO_5$:Tb and $Zn_2SiO_4$:Mn phosphors in amounts of: about 30 to 60 weight percent of $Y_3(Al,Ga)_5O_{12}$:Tb phosphor, no more than about 50 weight percent of $Y_2SiO_5$:Tb phosphor, and no more than about 10 weight percent of $Zn_2SiO_4$:Mn phosphor.

The other object of the present invention is accomplished by a cathode-ray tube having fixed to a surface thereof a mixed green-emitting phosphor manufactured by mixing and containing $Y_3(Al,Ga)_5O_{12}$:Tb, LaOCl:Tb, $Y_2SiO_5$:Tb and $Zn_2SiO_4$:Mn phosphors in amounts of: about 20 to 60 weight percent of $Y_3(Al,Ga)_5O_{12}$:Tb phosphor, no more than about 30 weight percent of LaOCl:Tb phosphor, no more than about 50 weight percent of $Y_2SiO_5$:Tb phosphor, and no more than about 20 weight percent of $Zn_2SiO_4$:Mn phosphor.

The other object of the present invention can be also accomplished by a cathode-ray tube comprising a mixed green-emitting phosphor manufactured by mixing and containing $Y_3(Al,Ga)_5O_{12}$:Tb, $Y_2SiO_5$:Tb and $Zn_2SiO_4$:Mn phosphors in the following concentrations: about 20 to 60 weight percent of $Y_3(Al,Ga)_5O_{12}$:Tb phosphor, no more than about 60 weight percent of $Y_2SiO_5$:Tb phosphor, and no more than about 20 weight percent of $Zn_2SiO_4$:Mn phosphor.

DETAILED DESCRIPTION OF THE INVENTION

A phosphor of the present invention, as a green-emitting phosphor manufactured by mixing three or four phosphors, is manufactured so as to have excellent characteristics by keeping the merits of each phosphor while mutually complementing their drawbacks.

The characteristics of each green-emitting phosphor used in manufacturing the mixed phosphor of the present invention is described in the following Table 1.

TABLE 1

|  | luminance | luminance saturation | color purity | afterglow time | life time |
|---|---|---|---|---|---|
| $Y_3(Al_2Ga)_5O_{12}$:Tb | ○ | ○ | x | ○ | ○ |
| LaOCl:Tb | Δ | ○ | ○ | ○ | ○ |
| $Y_2SiO_5$:Tb | Δ | ⊚ | ○ | ○ |  |
| $Zn_2SiO_4$:Mn | ○ | x | ⊚ | x | x |

\* ⊚: excellent
○: good
Δ: normal
x: poor

The mixed green-emitting phosphor of the present invention, in consideration of the above-mentioned merits and drawbacks of each phosphor, is obtained by selecting and then mixing each phosphor in a proper mixing ratio. Accordingly, choice of the mixing ratio of each phosphor is very important. The mixing amount of each phosphor is defined by the following.

When the mixing amount of $Y_3(Al,Ga)_5O_{12}$:Tb phosphor is less than about 20 weight percent, the luminance characteristics of the mixed phosphor is undesirably reduced. When the amount is more than about 60 weight percent, the characteristics of the color purity is reduced. Accordingly, the mixing amount of the $Y_3(Al,Ga)_5O_{12}$:Tb phosphor should be within the range of about 20 to about 60 weight percent.

When the mixing amount of the LaOCl:Tb phosphor is more than about 30 weight percent, the luminance and the luminance saturation characteristics of the mixed phosphor decrease. Accordingly, the mixing amount of the LaOCl:Tb phosphor should be more than O and less than about 30 weight percent.

For the $Y_2SiO_5$:Tb phosphor, when the mixing amount is more than 50 weight percent, the luminance saturation characteristics are improved. Meanwhile, the initial luminance is reduced. Accordingly, the mixing amount of this phosphor should be more than 0 but not more than about 50 weight percent.

Moreover, when the mixing amount of the $Zn_2SiO_4$:Mn phosphor is more than about 20 weight percent, the color purity and the initial luminance are improved. Meanwhile, the deterioration and the luminance saturation characteris-tics are reduced. Accordingly, the amount should be more than O but not more than about 20 weight percent.

Each phosphor used to manufacture the mixed phosphor of the present invention is prepared according to the following methods.

1) Manufacture of a $Y_3(Al,Ga)_5O_{12}$:Tb phosphor 100 g of yttrium oxide ($Y_2O_3$), 52.7 g of aluminum oxide ($Al_2O_3$), 41.5 g of gallium oxide ($Ga_2O_3$), 10 g terbium oxide($Tb_4O_7$), and 7 g of barium fluoride ($BaF_2$) are homogeneously mixed and then fired at 1450 to 1550° C. for one to three hours. After cooling the fired mixture, washing and drying gives $Y_3(Al,Ga)_5O_{12}$:Tb phosphor.

2) Manufacture of a LaOCl:Tb phosphor

To mix 100 g of lanthanum oxide ($La_2O_3$) and 15 g of terbium oxide ($Tb_4O_7$) homogeneously, they are dissolved in a proper amount of nitric acid. Then an oxalic acid coprecipitate of La and Tb using 70 g of oxalic acid is manufactured. After drying the obtained coprecipitate, first-firing at about 1000° C., then dry-mixing with 50 g of $NH_4Cl$, second-firing at about 450° C. in a furnace, and then third-firing at 1000 to 1200° C. under a reducing atmosphere for about two hours, washing and drying give the LaOCl:Tb phosphor.

3) Manufacture of a $Y_2SiO_5$:Tb phosphor 100 g of Yttrium oxide ($Y_2O_3$), 12 g of silicon dioxide ($SiO_2$), 10 g of terbium oxide ($Tb_4O_7$), and 7 g of barium fluoride ($BaF_2$) are homogeneously mixed and fired at about 1200 to 1400° C. for one to three hours under a weak reducing atmosphere. After washing the fired material, drying gives the $Y_2SiO_5$:Tb phosphor.

4) Manufacture of a $Zn_2SiO_4$:Mn phosphor 40 g of zinc oxide (ZnO), 60 g of silicon dioxide ($SiO_2$), and 2 g of manganese sulfate ($MnSO_4$) are mixed and fired at 1250 to 1300° C. for two to four hours. Washing and drying the fired material give the $Zn_2SiO_4$:Mn phosphor.

Four fluorescent materials obtained as mentioned above are mixed in the predetermined percent by weight, based on the total weight of the mixed phosphor, so as to give the mixed green-emitting phosphor of the present invention. The mixing percentages of each sample according to some embodiments of the present invention are illustrated in Table 2.

TABLE 2

| | phosphor (percent wt./wt.) | | | | |
|---|---|---|---|---|---|
| sample | A | B | C | D | E |
| #1 | 65 | | | 5 | 30 |
| #2 | 50 | 20 | 20 | 10 | |
| #3 | 40 | 20 | 30 | 10 | |
| #4 | 30 | 20 | 40 | 10 | |
| #5 | 20 | 20 | 50 | 10 | |
| #6 | 50 | 10 | 30 | 10 | |
| #7 | 40 | 30 | 20 | 10 | |
| #8 | 40 | 30 | 25 | 5 | |
| #9 | 40 | 20 | 25 | 15 | |
| #10 | 60 | 10 | 20 | 10 | |
| #11 | 60 | | 30 | 10 | |
| #12 | 50 | | 40 | 10 | |
| #13 | 40 | | 50 | 10 | |

TABLE 2-continued

| | phosphor (percent wt./wt.) | | | | |
|---|---|---|---|---|---|
| sample | A | B | C | D | E |
| #14 | 30 | | 60 | 10 | |
| #15 | 40 | | 50 | 10 | |
| #16 | 40 | | 40 | 20 | |

In Table 2, phosphor A is $Y_3(Al,Ga)_5O_{12}$:Tb, phosphor B is LaOCl:Tb, phosphor C is $Y_2SiO_5$:Tb, phosphor D is $Zn_2SiO_5$:Mn, and phosphor E is $InBO_3$:Tb.

Using each sample, projection cathode-ray tubes are manufactured according to the conventional method and the emitting characteristics according to the mixing ratio of each phosphor are measured, which are shown in Table 3. For reference, the x coordinate is less than 0.350 and the y coordinate is more than 0.550 in the chromaticity coordinate for the green color.

TABLE 3

| | luminance (ft · L) with relation to current | | | | | Luminance saturation | chromic coordinates | |
|---|---|---|---|---|---|---|---|---|
| sam-ples | 200 ($\mu A$) | 350 ($\mu A$) | 500 ($\mu A$) | 900 ($\mu A$) | 1200 ($\mu A$) | ($\gamma$) | x | y |
| #1 | 2521 | 4263 | 7930 | 10460 | 13298 | 0.879 | 0.3219 | 0.5925 |
| #2 | 2561 | 4341 | 8031 | 11910 | 14514 | 0.945 | 0.3198 | 0.5954 |
| #3 | 2554 | 4318 | 8022 | 11940 | 14916 | 0.960 | 0.3188 | 0.5961 |
| #4 | 2526 | 4292 | 8010 | 11891 | 14671 | 0.968 | 0.3160 | 0.6002 |
| #5 | 2496 | 4208 | 7981 | 11819 | 14616 | 0.976 | 0.3150 | 0.6008 |
| #6 | 2543 | 4296 | 8070 | 11892 | 14678 | 0.962 | 0.3291 | 0.5891 |
| #7 | 2547 | 4301 | 7892 | 11804 | 14411 | 0.943 | 0.3201 | 0.5996 |
| #8 | 2510 | 4280 | 7801 | 11782 | 14339 | 0.952 | 0.3301 | 0.5871 |
| #9 | 2601 | 4344 | 8042 | 11926 | 14529 | 0.931 | 0.3154 | 0.6011 |
| #10 | 2571 | 4308 | 8030 | 11976 | 14593 | 0.946 | 0.3214 | 0.5908 |
| #11 | 2561 | 4301 | 8113 | 12018 | 14813 | 0.964 | 0.3294 | 0.5887 |
| #12 | 2554 | 4298 | 8115 | 12084 | 14864 | 0.970 | 0.3292 | 0.5888 |
| #13 | 2549 | 4294 | 8109 | 12106 | 14973 | 0.979 | 0.3274 | 0.5981 |
| #14 | 2541 | 4288 | 8110 | 12096 | 14956 | 0.981 | 0.3251 | 0.5986 |
| #15 | 2611 | 4321 | 8101 | 11840 | 14475 | 0.924 | 0.3111 | 0.6118 |
| #16 | 2623 | 4336 | 8111 | 11821 | 14463 | 0.919 | 0.3144 | 0.6109 |

*The value of the current was increased from 200 to 1200 $\mu A$ at a voltage of 32 kV and simultaneously the luminance was measured, thereby computing the value of the luminance saturation ($\gamma$) according to the following formula.

$$\gamma = \frac{\text{luminance at 1200 } \mu A}{\text{luminance at 200 } \mu A} \times \frac{1}{6}$$

*The color coordinates are the values at 350 $\mu A$.
*The characteristic values of each emitting are at the voltage of 32 kV and in the raster size of 122 × 69 mm$^2$ As shown in Table 2, the phosphor layer manufactured by using the mixed phosphor of the present invention has excellent phosphor layer characteristics. Particularly, the result for sample #1, including the $InBO_3$:Tb phosphor, shows that luminance characteristics are not good under high current density. Meanwhile, samples #2–#16, as the mixed phosphors of the present invention, have excellent luminance characteristics under high current density, and are better than the conventional phosphor whose luminance saturation is 0.879 when considering the value of the luminance saturation which is from 0.931 to 0.981. From the result of the cathode-ray tube employing the samples #11–#16, it is confirmed that the phosphor mixed with three phosphors without the LaOCl:Tb phosphor also have excellent effects.

What is claimed is:

1. A mixed green-emitting phosphor comprising $Y_3(Al, Ga)_5O_{12}$:Tb, LaOCl:Tb, $Y_2SiO_5$:Tb and $Zn_2SiO_4$:Mn phosphors in the following concentrations by weight:
   20 to 60% of $Y_3(Al, Ga)_5O_{12}$:Tb,
   no more than 30% of LaOCl:Tb,
   no more than 50% of $Y_2SiO_5$:Tb, and
   no more than 20% of $Zn_2SiO_4$:Mn.

2. A mixed green-emitting phosphor according to claim 1 comprising:
   20 to 50% of $Y_3(Al, Ga)_5O_{12}$:Tb,
   no more than 20% of LaOCl:Tb,
   no more than 40% of $Y_2SiO_5$:Tb, and
   no more than 10% of $Zn_2SiO_4$:Mn.

3. A mixed green-emitting phosphor according to claim 1 wherein said phosphor is free of $InBO_3$:Tb phosphor.

4. A mixed green-emitting phosphor comprising $Y_3(Al, Ga)_5O_{12}$:Tb phosphor, $Y_2SiO_5$:Tb phosphor and $Zn_2SiO_4$:Mn phosphor in the following concentrations by weight:
   20 to 60% of $Y_3(Al, Ga)_5O_{12}$:Tb,
   no more than about 60% of $Y_2SiO_5$:Tb, and
   no more than 20% of $Zn_2SiO_4$:Mn.

5. A mixed green-emitting phosphor according to claim 4 comprising:
   30 to 60% of $Y_3(Al, Ga)_5O_{12}$:Tb,
   no more than 50% of $Y_2SiO_5$:Tb, and
   no more than 10% of $Zn_2SiO_4$:Mn.

6. A mixed green-emitting phosphor according to claim 4 wherein said phosphor is free of $InBO_3$:Tb phosphor.

7. A cathode-ray tube of high luminance including a mixed green-emitting phosphor comprising $Y_3(Al,Ga)_5O_{12}$:Tb, LaOCl:Tb, $Y_2SiO_5$:Tb and $Zn_2SiO_4$:Mn phosphors in the following concentrations by weight:
   20 to 60% of $Y_3(Al, Ga)_5O_{12}$:Tb,
   no more than 30% of LaOCl:Tb,
   no more than 50% of $Y_2SiO_5$:Tb, and
   no more than 20% of $Zn_2SiO_4$:Mn fixed on a surface of a cathode-ray tube.

8. A cathode-ray tube of high luminance according to claim 7 wherein said mixed green-emitting phosphor is free of $InBO_3$:Tb phosphor.

9. A cathode-ray tube of high luminance including a mixed green-emitting phosphor comprising $Y_3(Al,Ga)_5O_{12}$:Tb, $Y_2SiO_5$:Tb, and $Zn_2SiO_4$:Mn phosphors in the following concentrations by weight:
   20 to 60% of $Y_3(Al, Ga)_5O_{12}$:Tb,
   no more than 60% of $Y_2SiO_5$:Tb, and
   no more than 20% of $Zn_2SiO_4$:Mn fixed to a surface of a cathode-ray tube.

10. A cathode-ray tube of high luminance according to claim 9 wherein said mixed green-emitting phosphor is free of $InBO_3$:Tb phosphor.

11. A method of forming a mixed green-emitting phosphor comprising mixing $Y_3(Al, Ga)_5O_{12}$:Tb, LaOCl:Tb, $Y_2SiO_5$:Tb and $Zn_2SiO_4$:Mn phosphor in the following concentrations by weight:

20 to 60% of $Y_3(Al, Ga)_5O_{12}$:Tb, no more than 30% of LaOCl:Tb, no more than 50% of $Y_2SiO_5$:Tb, and no more than 20% of $Zn_2SiO_4$:Mn and forming a mixed green phosphor.

12. A method of forming a mixed green-emitting phosphor according to claim 11 wherein said phosphor is free of $InBO_3$:Tb phosphor.

13. A method of forming a mixed green-emitting phosphor comprising mixing $Y_3(Al,Ga)_5O_{12}$:Tb phosphor, $Y_2SiO_5$:Tb phosphor and $Zn_2SiO_4$:Mn phosphor in the following concentrations by weight:

20 to 60% of $Y_3(Al, Ga)_5O_{12}$:Tb, no more than 60% of $Y_2SiO_5$:Tb, and no more than 20% of $Zn_2SiO_4$:Mn and forming a mixed green phosphor.

14. A method of forming a mixed green-emitting phosphor according to claim 13 wherein said phosphor is free of $InBO_3$:Tb phosphor.

* * * * *